(12) United States Patent
Straub et al.

(10) Patent No.: US 12,120,115 B2
(45) Date of Patent: Oct. 15, 2024

(54) METHODS AND APPARATUS FOR PROVISIONING SERVICES WHICH REQUIRE A DEVICE TO BE SECURELY ASSOCIATED WITH AN ACCOUNT

(71) Applicant: TIME WARNER CABLE ENTERPRISES LLC, St. Louis, MO (US)

(72) Inventors: Albert William Straub, Westminster, CO (US); Miles Anton Johnson, New York, NY (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 16/036,892

(22) Filed: Jul. 16, 2018

(65) Prior Publication Data
US 2018/0324183 A1    Nov. 8, 2018

Related U.S. Application Data

(63) Continuation of application No. 14/539,794, filed on Nov. 12, 2014, now Pat. No. 10,027,667.

(51) Int. Cl.
*H04L 9/40*      (2022.01)
*G06F 21/44*     (2013.01)
(Continued)

(52) U.S. Cl.
CPC .......... *H04L 63/0884* (2013.01); *G06F 21/44* (2013.01); *H04L 63/06* (2013.01);
(Continued)

(58) Field of Classification Search
CPC .......... G06F 21/34; G06F 21/35; G06F 21/42; G06F 21/43; G06F 21/44;
(Continued)

(56) References Cited

U.S. PATENT DOCUMENTS

| 6,189,102 B1 * | 2/2001 | Beser .................. H04L 61/2015 |
| | | 709/201 |
| 2012/0033642 A1 * | 2/2012 | Sing ....................... H04W 48/12 |
| | | 370/331 |

(Continued)

OTHER PUBLICATIONS

T. Chung, I. Mashal, O. Alsaryrah, T. Hsu, C. Chang and W. Kuo, "Design and implementation of light-weight smart home gateway for Social Web of Things," 2014 Sixth International Conference on Ubiquitous and Future Networks (ICUFN), Shanghai, 2014, pp. 425-430. (Year: 2014).*

(Continued)

*Primary Examiner* — Theodore C Parsons
(74) *Attorney, Agent, or Firm* — Straub & Straub; Michael P. Straub; Stephen T. Straub

(57) ABSTRACT

Methods and apparatus for provisioning and providing services to devices on a local network are described. The methods and apparatus allow for the provisioning of services to customer owned and managed devices on a local network on which another device, e.g., a first device, has already been authenticated and authorized to receive services corresponding to a customer account. After a first device on a local network is authenticated and associated with a customer account it detects the addition of new devices on the local network and assists in the registration of the new device by acting as an intermediary with a service provider device during the registration process. The security and registration established by the first device is leveraged allowing other devices on the network to be registered and authenticated for services corresponding to the same account as the first device without requiring user input of authentication and/or other information.

27 Claims, 7 Drawing Sheets

(51) Int. Cl.
*H04L 41/28* (2022.01)
*H04W 12/30* (2021.01)
*H04W 12/43* (2021.01)

(52) U.S. Cl.
CPC ......... *H04L 63/0876* (2013.01); *H04W 12/35* (2021.01); *G06F 2221/2129* (2013.01); *H04L 41/28* (2013.01); *H04L 63/08* (2013.01); *H04W 12/43* (2021.01)

(58) Field of Classification Search
CPC ...... G06F 2221/2129; H04W 12/0023; H04W 12/00403; H04W 12/06; H04W 12/00503; H04W 12/009; H04L 41/28; H04L 63/06; H04L 63/08; H04L 63/0853; H04L 63/0876; H04L 63/0884; H04L 63/18; H04L 9/3234
See application file for complete search history.

(56) References Cited

U.S. PATENT DOCUMENTS

| | | | | |
|---|---|---|---|---|
| 2013/0060942 A1* | 3/2013 | Ansari | ............... | H04L 12/2807 709/225 |
| 2013/0132854 A1* | 5/2013 | Raleigh | ................ | G06F 3/0482 715/738 |
| 2013/0227660 A1* | 8/2013 | Murakami | ............. | H04L 63/08 726/5 |
| 2014/0344897 A1* | 11/2014 | Cholas | ................. | H04L 63/062 726/4 |
| 2015/0078357 A1* | 3/2015 | L'Heureux | ........... | H04W 12/06 370/338 |

OTHER PUBLICATIONS

Ashraf et al., Broadcast Based Registration Technique for Heterogeneous Nodes in the IoT, International Conference on Control, Engineering & Information Technology, CEIT'14 (2014) (Year: 2014).*

Muhamed Turkanović, Boštjan Brumen, Marko Hölbl, A novel user authentication and key agreement scheme for heterogeneous ad hoc wireless sensor networks, based on the Internet of Things notion, Ad Hoc Networks, vol. 20, Sep. 2014, pp. 96-112 (Apr. 13, 2014) (Year: 2014).*

* cited by examiner

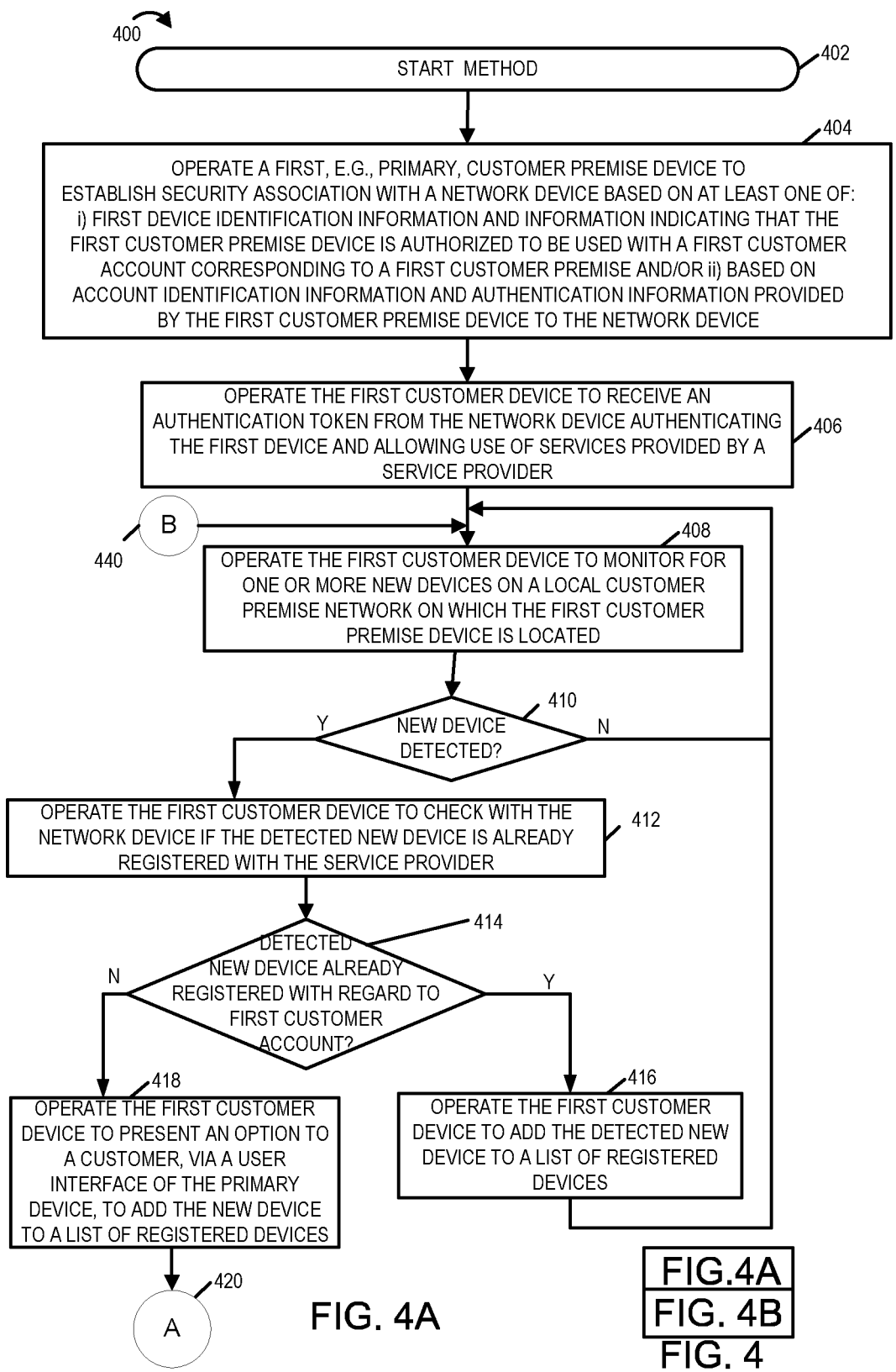

METHODS AND APPARATUS FOR PROVISIONING SERVICES WHICH REQUIRE A DEVICE TO BE SECURELY ASSOCIATED WITH AN ACCOUNT

RELATED APPLICATIONS

The present application is a continuation of U.S. patent application Ser. No. 14/539,794 filed on Nov. 12, 2014 which is hereby expressly incorporated by reference.

FIELD

The present invention relates to methods and apparatus for providing services and, more particularly, for provisioning a service where the provisioning includes, e.g., associating a device with an account in a manner that allows for a level of security, e.g., by authenticating and/or authorizing one or more devices to use a service corresponding to an account.

BACKGROUND

As part of providing a service over a network, e.g., a cable network or fiber optic network, a device authentication and authorization procedure is normally used. This allows services to be provided to devices entitled to receive a service, e.g., in accordance with a service contract corresponding to an account with which the device corresponds, while services will be denied to devices which are not entitled to receive the services.

Leased television STBs often use a built-in unique identifier such as a network interface Media Access Control (MAC) address. The MAC address is often used to provision the device with a specific account since in the case of a lease, the MAC address of the device can be associated with the account of the customer to whom the leased device is supplied, e.g., at the time or prior to the device being provided to the customer leasing the device. Since the MAC address is generally known at the time a device is leased, difficult to falsify and can be communicated at the time the leased device seeks to register for a service, it is often used for authenticating and/or registering a leased device without the need for the customer to enter information used for authentication and/or account identification.

Customer Owned And Managed (COAM) devices are purchased from retail stores and installed by the customer. In such cases, since the service provider is not providing the device, the MAC address of the device is initially unknown to the service provider and is not associated with the account of a user. The MAC address, or any other unique identifier in the case of a COAM device is often unknown or unavailable to software provided by a pay-television provider or to software supplied by such a service provider that maybe loaded onto the COAM device in order for the user to obtain access to the service. An example of such a situation is where a web browser on a COAM device is used for the user interface via which a user accesses a service.

In the case of leased devices, a user can often activate and use the device based on authentication and/or authorization procedure that are based on the devices MAC address and the fact that the leased device is normally associated with the user's account at the time the user leases the device.

In the case of COAM devices, the user may have to download software, initiate contact with a security server or other network device before being able to receive service. As part of the interaction with the security server the user may have to provide account information, a password and/or other information required to authenticate the user and/or device. While having a user provide such information is possible, it is not user friendly. Often a user has difficulty remembering account information, password information and/or COAM device identification information that may be requested as part of the process of provisioning a COAM device, e.g., authenticating the user and/or device, authorizing the device and associating it with an account. Moreover such manual provisioning/authentication process is a further annoyance in cases where the user may be using several such COAM devices with the user having to manually go through the authentication process for each such device.

In view of the above discussion it should be appreciated that there is a need for new and improved service provisioning methods which would allow for the use of a COAM device without the hassle of a user to manually provide the authentication and other information now commonly required before a COAM device is allowed to receive a service for which a subscription and/or a customer account is required.

SUMMARY

Methods and apparatus for provisioning and providing services to COAM devices are described. The methods and apparatus allow for the provisioning of services to COAM devices which are on local networks, e.g., home networks. The methods are particularly useful where a device, e.g., a first device, on a local network has already been authenticated and authorized to receive services and a customer adds another device, e.g., a COAM device, to the same local network. The methods reduce or avoid the need for a customer to provide account and/or authorization information when a new device is added to the same local network as the first device thereby supporting provisioning and/or authentication of COAM devices added on the local network, e.g., a wireless or wired home network, in an easy and convenient manner without the service provider having to have knowledge about the new device prior to its attachment to the local network.

In accordance with at least some embodiments, after a first device (e.g., leased and/or COAM) on a local network is authenticated and associated with a customer account it is used to register one or more other devices (e.g., COAM devices) with regard to the same customer account with which the first device is registered, without requiring manual authentication or entering of account information from a user to register the additional devices which are on the same local network as the first device. This is achieved, in at least some embodiments, by the first device detecting one or more additional devices on the local network and using its security information, e.g., security token, security key and/or other information relating to an established security relationship with a service provider device such as a network server, during the registration process of the second, e.g., new device, detected on the local network by the first device. In this manner the security and registration established by the first device can be leveraged to allow other devices on the network to be registered and authenticated for services corresponding to the same account as the first device without requiring user input of authentication and/or other information. The trust relationship of the first device which serves as an intermediary for the other devices on the local network is extended to the other devices on the local, e.g., home network, in a manner which is relatively transparent to the customer. In one particular embodiment this is done by the first device sending registration and/or other service request information to a service provider device, e.g., a security server used for authentication, authorization and/or registration with respect to a service along with security information, e.g., a value generated from a security token provided to the first device as part of the provisioning of the first device.

The service provider checks the credentials and/or authorization of the first device, e.g., by checking if the received value was generated using the security token previously supplied to the first device, and then issues a security token for the second device on the local network assuming the first device which is communicating the registration/service request corresponding to the second device satisfies the normal security checks, e.g., the received value matches an expected value that would have been generated from the security token provided to the first device. The first device receives a security token and/or other registration information for the second device on the local network and supplies it to the second device for use in obtaining services and/or renewing its registration e.g., at predetermined intervals and/or in accordance with a defined schedule.

In order to prevent associating a device which attaches to a local network from being unintentionally associated with the customer account of the owner of the local network, the first device may, after detecting a device which it does not recognize as being registered, and in some embodiments does, present a user of the first device an opportunity to indicate whether they want the newly detected device to be associated with the user's, e.g., customer's account. The user may indicate that the newly recognized device is to be associated with the customer's account as would normally be the case when the detected device is a newly purchased COAM device corresponding to a household member of the customer premise where the first device is located. However, if the detected device is owned by a visitor, as may be the case where the local network is a wireless network and a guest is accessing the Internet via the local network, the user may indicate that the detected device is not to be registered and associated with the same customer's account as the first device.

The first customer device in some embodiments includes a record of registered devices on the local network as well as devices which were detected but which were not registered, e.g., due to user input indicating that the device was not to be registered and/or associated with the same customer account as the first device.

In at least some embodiment the first device is a set top box, cable modem, gateway device, FIOS device or other device which is leased and configured for service based on a MAC address without requiring user input for authentication and/or account identification purposes. In other embodiments the first device is a device which is registered and associated with the user account based on information supplied by a user of the first device and security information, e.g., a password, supplied by the user of the first device.

By leveraging and extending security associations that a first device has with a service provider to other devices that the first device detects on a home network or other local network on which the first device is located, e.g., attached, a user can add devices to the local network and have them obtain access to the services corresponding to the customer's account without complicated login or security procedures being required for the devices which are added to the local network.

Numerous additional features, embodiments and advantages are described in the detailed description which follows.

DETAILED DESCRIPTION

Figure 1:
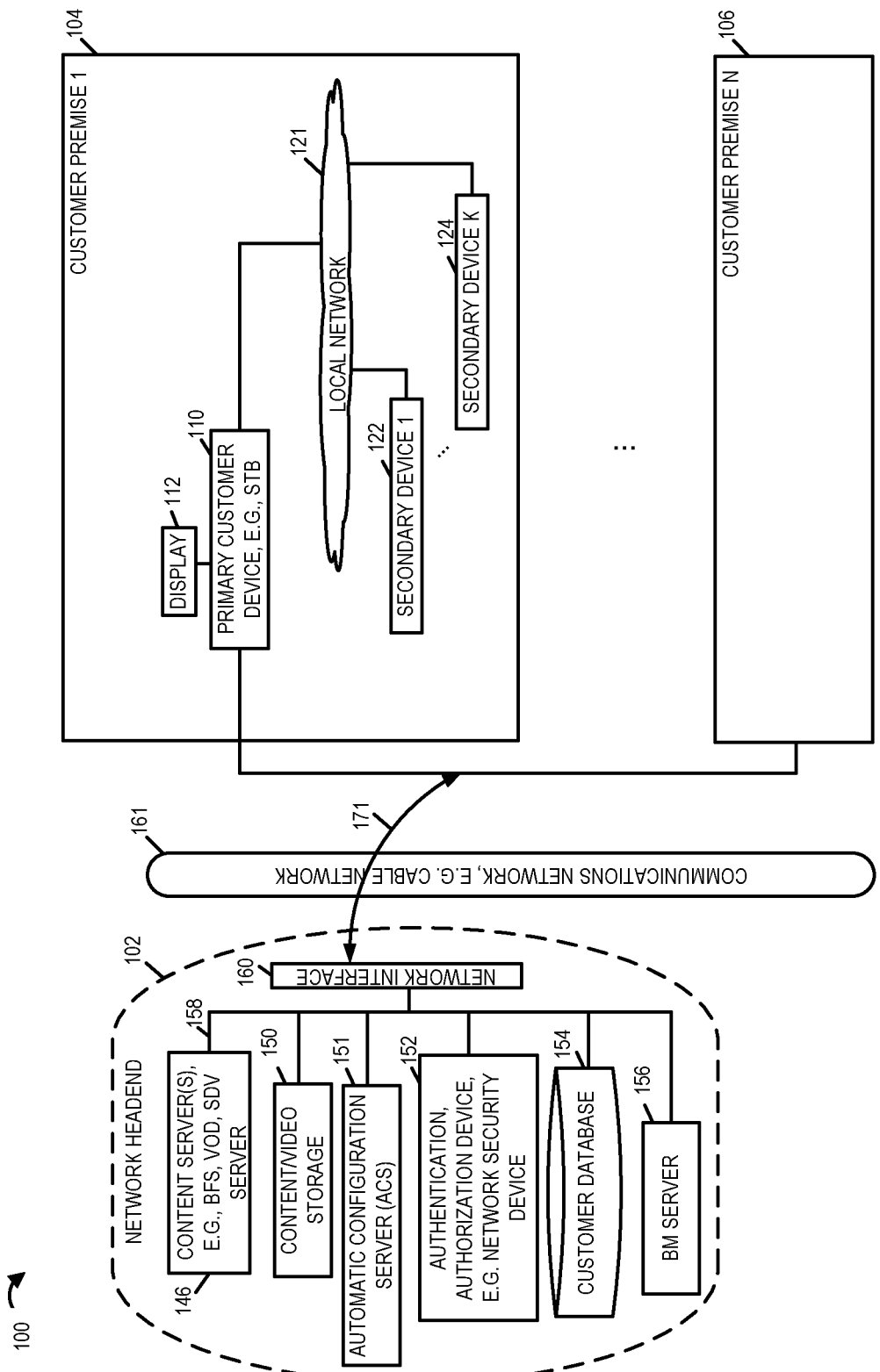
FIG. 1 illustrates an exemplary system in which the methods of the present invention may be, and sometimes are, used.

FIG. 1 illustrates an exemplary system 100 in which the methods of the present invention may be, and sometimes are, used. The system 100 supports delivery of content and/or other information, e.g., security/authentication tokens, to Customer Premise Equipments (CPEs) including content playback devices in accordance with various embodiments of the invention. The system 100 includes a network headend 102, a cable network 161, e.g., a Hybrid Fiber-Coaxial (HFC) network, and a plurality of customer premises 104, 106. In various embodiments the content, e.g., multimedia content, is delivered from the headend 102 over the cable network 161 to one or more devices in the customer premise 104, 106.

The network headend 102 may be implemented at a cable network office or hubsite serving a plurality of customer premises and includes multiple servers and databases which are coupled together as shown. In the FIG. 1 example, the headend 102 includes content server(s) 146, a content storage 150, an authentication and authorization device, e.g., network security device 152, a customer database 154 and a business management server 156. The content server(s) 146 in some embodiments include one or more content delivery devices including, e.g., a Broadcast File Server (BFS), Video On-Demand (VOD) server, a Switched Digital Video (SDV) content server, and an IP content server. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 158. The local network 158 is coupled via one or more network interfaces 160 to other networks and/or devices. For example, the headend 102 is coupled via network interface 160 to communications network 161, e.g., a cable network, and may also be coupled to one or more other external networks. The local network 121 may be a wired network, e.g., Ethernet based network, or wireless network.

Via the cable network 161, the elements shown in the network headend 102 can send and/or exchange various information with the devices located at the customer premises 104, 106. As shown in FIG. 1, communications link 171 traversing the cable network 161 couples the CPEs at the customer premises 104, 106 to the various elements/servers shown in the network headend 102.

The content server(s) 146, among other things, is responsible for delivering programming content and/or other information to one or more customer devices which support receiving content, e.g., by tuning to, e.g., QAM broadcast stream broadcasted by a broadcast server included in the content server(s) 146. The content server(s) 146 also provides Switched Digital Video (SDV) programming content to one or more content playback devices which support receiving SDV content and provides on-demand content in response to a user request received via network 161 from one or more devices at customer premises 104, 106. The content server(s) 146 also provides programming content to one or more IP capable customer devices which support receiving IP content. In various embodiments the content server(s) 146 access the programming content from the content storage 150 and generates transport streams suitable for delivery to various CPEs via the communications network 161. The content storage 150 stores content, e.g., audio, video and/or other multimedia content. In some embodiments the content stream is encrypted prior to delivery to the CPEs over the communications network 161.

The Automatic Configuration Server (ACS) 151 provides initial configuration information and network connectivity parameters to customer premise devices, e.g., such as set top boxes, and facilitates network connectivity. In some embodiments the ACS 151 is a TR-69 compliant ACS. A customer device which needs configuration contacts the ACS 151 and requests configuration. In various embodiments the ACS 151 in response provides, via TR-69, configuration information.

The authentication and authorization device 152, also referred to as the network security device, is configured to generate appropriate authorization tokens, security licenses, registration certificates, and unique identifiers that can be assigned to customer devices seeking services from the service provider headend 102. Thus in various embodiments the network security device 152 authenticates customer devices allowing association with a corresponding customer's account in order to obtain services that the customer is allowed to access. In some embodiments the network security device 152 also generates encryption and decryption keys that can be used by used to encrypt and decrypt programming content by the content delivery server(s) 146 and/or by one or more customer devices for encrypting and decrypting programming content, e.g., recorded content. In accordance with one feature of some embodiments of the invention a newly added second customer device, e.g., a COAM device, at a customer premise needs to register with and obtain authentication tokens from the network security device 152 in order to obtain/access services offered to an already authenticated primary customer device associated with a customer account.

The customer database 154 includes, for a plurality of customers, customer identification information, account information and information regarding the authorized/registered devices installed at customer premises. In some embodiments customer account information includes, e.g., customer account number, customer subscription/service information, customer device capability and other billing related information. Customer database 154 also includes customer device information, e.g., identification and/or other information regarding customer devices such as the set top boxes, cable modems, gateway devices etc., installed at various customer premises served by the headend 102.

BM (Business management) server 156 processes billing information corresponding to customers serviced by the headend 102. This may include updating billing charge information in response to changes in services being provided to the customer, upgrades, on-demand content purchases, and/or other activity. BM server 156 also processes services bill payment information, e.g., payment transactions, deductions from debit accounts, mail bills, and/or processes discount and/or other information.

Referring now to the customer premises shown in the system 100. Each customer premise 104, 106 may include a plurality of devices including, e.g., set top boxes (STBs), gateways, modems, IP devices such as IP set top box, internet capable TV, personal computer, laptop, tablet device, smart phone etc. In FIG. 1 embodiment, customer premise 1 104 includes a primary customer device 110, e.g., STB, coupled to a display device 112. It should be appreciated that in some embodiments DVRs (digital video recorder) are included in customer premise devices, e.g., STBs, which can be integrated in a device including a display. In accordance with one aspect the primary device 110 has an established security association with a customer account corresponding to a customer/subscriber of customer premise 104, that is, the primary device 110 is a device, used by the customer/subscriber of customer premise 104 to access services from the headend 102, that is registered and has obtained authentication from the network security device 152 at some point in time. The primary device 110 may be a leased device or another COAM device that has been authenticated at some point. There is also a local network 121, e.g., home network, at the customer premise 104 over which the primary device can interact with one or more other devices at the customer premise 104. At some point in time, one or more secondary devices, such as secondary device 1 122 to secondary device K 124 are added to the customer premise 104 which are detected by the primary device 110 on the local network 121. Thus in some embodiments the primary device 110 and one or more secondary devices 122, 124 are coupled to the local home network 121 over which they can communicate and exchange information. In some embodiments the secondary devices 122, 124 are COAM devices which do not have an established security association with the customer account corresponding to a customer/subscriber of customer premise 104. In various embodiments the primary customer device 110 that already has established security relationship with the network device 152 facilitates automatic authentication of the newly added secondary devices 122, 124 in accordance with the features of the invention thereby allowing the devices to access services which the customer/account holder is allowed to access.

While FIG. 1 shows the customer premise 104 in detail, other customer premises in the system may be similar to the customer premise 104 and may include same or similar devices.

Figure 2:
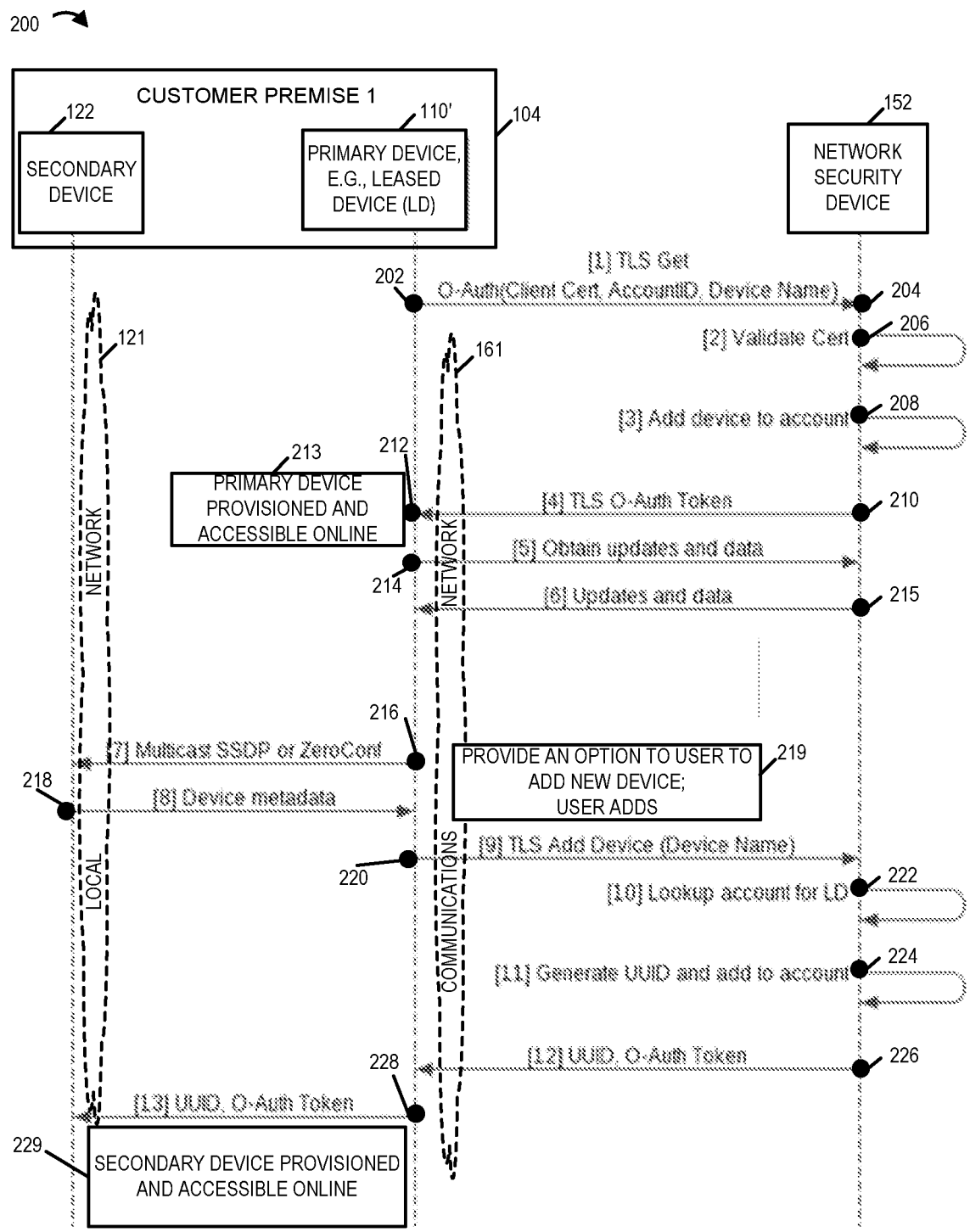
FIG. 2 is a signaling diagram illustrating various signals, e.g., messages, which are communicated between devices of the system of FIG. 1 as part of implementing an exemplary method in accordance with one exemplary embodiment.

An exemplary method will now be discussed in detail with regard to the example shown in FIGS. 2 and 3. Elements of the system 100 shown in FIG. 1 which participate in the method being described in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in the exemplary method of provisioning and authenticating a secondary device, e.g., COAM device, on a local network in a customer premise in accordance with one embodiment of the invention, are shown.

The illustrated elements 200 include a primary customer premise device 110' and a secondary device 122 included in the customer premise 104 and the network security device 152. The primary customer premise device 110' is similar to the customer premise device 110 described with regard to FIG. 1 however in the particular example of FIG. 2 it is a leased device (LD) which may have been leased to the customer and therefore has been identified using number 110'. The secondary device 122 is a COAM device. The primary customer device 110' and secondary customer device 122 communicate over the local network 121 while the communications between the primary device 110' and the network security device 152 is over the communications network 161. Furthermore, for the purposes of FIGS. 2 and 3 example, consider that the primary device 110'/110'' is an IP set top box.

As shown, FIG. 2 illustrates the steps and associated signaling used in one exemplary embodiment where first the leased primary customer device 110' registers with the service provider and establishes a security association with the customer account corresponding to the customer of customer premise 104 and then the authentication and provisioning of the secondary device 122 is facilitated by the primary device 110' in accordance with the features of the invention. In the FIG. 2 example since the primary device 110' is a leased device provided by the service provider, the authentication and provisioning of the primary device 110' is automatic.

The process starts with the primary device 110' being turned on and obtaining parameters for network connectivity. The initial processing includes the primary device 110' receiving an IP address (e.g., in the form of a URL) of the ACS 151 from a Dynamic Host Configuration Protocol (DHCP) server. The DHCP server also provides an IP addresses (e.g., IPV4 & 6) that the primary device 110' can use to communicate over the network. The primary device 110' extracts the URL for the ACS 151, sends its assigned IP address (as provided by the DHCP server) and requests configuration. The ACS 151 then provides, via TR-69, the URL to the IP of the image the leased primary device 110' is to load and execute. Once loaded, the leased primary device 110' is able to generate and/or obtain a security certificate that it can use to obtain authentication from the network security device 152.

In step 202 the primary device 110' sends request (e.g., transport layer security (TLS) compliant request) including its security certificate, an account ID and device name to the network security device 152 to obtain an authentication token in order to register and obtain services from the service provider. In various embodiments the account ID and device name are pre-loaded into the primary device 110' and/or obtained during initial configuration. In some embodiments the security certificate is an X.509 client certificate (RFC-1422, RFC-2459, RFC-5280).

In step 204 the network security device 152 receives the request. In step 206 the network security device 152 analyzes the security certificate and compares the hash of a subject line identifier to that of devices that have been assigned by the service provider billing system, e.g., BMS 156, to the customer account related to the customer premise 104. In some embodiments the network security device 152 performs a customer database 154 lookup to perform the comparison. Upon verification, in step 206 the network security device 152 updates the customer database to add the primary device 110' to a list of registered devices associated with the customer's account. Once the certificate is verified with the customer account, next in step 206 the network security device 152 sends an authentication token to the primary device 110'. The primary device 110' receives the authentication token in step 212. In some embodiments the authentication token is an O-Auth 1.0 token. From this point forward, the primary device 110' is considered authenticated and can access services, e.g., content and metadata services as indicated by box 213.

In step 214 the primary device 110' requests to obtain updates and data. In step 215 the service provider headend 102 sends the obtain updates and data to the primary device 110'.

For discussion purposes consider that after the leased primary device has been authenticated and able to access services, the secondary device 122, e.g., COAM device, is added to the customer premise 104. The secondary device 122 maybe a Smart TV, a tablet device such as an iPAD, a recording device, or another device with a user interface. The secondary device 122 receives an IP address (e.g., IPv6 address) from the internet service provider. Consider that the secondary device 122 is configured for Zero Conf (AKA Bonjour® from Apple®) or Simple Service Discovery Protocol (SSDP), which is encompassed in the Digital Living Network Alliance (DLNA) device discovery specifications, so that it can be discovered (via SSDP or Zero Conf) on the local network 121. In step 216 the primary device 110' multicasts service announcements using SSDP or Zero Conf. The secondary device 122 hears the multicast and in step 218 sends a response with secondary device 122 metadata which is detected by the primary device 110'. Accordingly the primary device 110' detects the secondary device 122 on the local network 121 (e.g., via SSDP or Zero Conf).

Upon detecting the presence of another device on the local network, the primary device 110' checks with the service provider network security device 152 whether the newly detected secondary device 122 is registered with the same customer account associated with the primary device 110'. If the network security device 152 responds to the primary device 110' informing that the secondary device 122 is already registered then in some embodiments the primary device simply adds the new device 122 to a pool of known devices on the network. However if it is determined that the secondary device 122 is not registered and/or is unknown then the primary device 110' presents a prompt to the customer asking whether the customer wishes to add and/or associate the secondary device 122 with their account as indicated by box 219. For discussion purposes consider that the customer wishes to add the secondary device (also indicated by box 219).

In step 220 the primary device 110' sends a TLS request to the network security device 152 to add and/or associate the secondary device 122 with the customer account. In some embodiments part of the request message to provision the new device 122 includes either a default or a custom human readable name. Thus in some embodiments the request message includes the secondary device 122 name and/or other identification information. The network device 152 receives the request and in step 222 looks up the account associated with the leased primary device 110' to add the secondary device 122.

In step 224 the network device 152 generated a Universally Unique ID (UUID) for the secondary device 122 and adds the secondary device 122 to be associated with the customer account corresponding to the customer of customer premise 104. In step 226 the network security device 152 sends the generated UUID and an authentication token (e.g., an O-Auth token) for the secondary device 122 to the primary device 110' over the communications network 161. Next, the primary device 110' receives the UUID and authentication token for the secondary device 122 and in step 228 the primary device 110' communicates the network assigned UUID, authentication token and address information (e.g., IP address) corresponding to one or more service provider servers/devices to the secondary device 122 over the local network 121. In some embodiments this communication from the primary device 110' to the secondary device 122 is secure, e.g., via TLS or other secure connection. At this point the secondary device 122 is considered authenticated and can access services, e.g., content and metadata services provided by the service provider, as indicated by box 229.

Following authentication, the secondary device 122 can contact the service provider content and software update services using the newly obtained credentials and address information corresponding to one or more service provider servers/devices.

In some embodiments the secondary device 122 first contacts the headend 102 to send data describing the functions available on the secondary device 122. In case if the device 122 is a DVR, e.g., a centralized DVR added to the customer premise 104, then it provides the make, model, disk storage size, and API information (WADL (Web Application Description Language) along with version number). If the WADL description indicates that the secondary device 122 is useable by the service provider headend 102 then the information is added to a Settings, Preferences, and Profiles (SPP) database.

In some embodiments the response to the registration with service provider headend 102 is the IP address of a Push Notification Service which in some embodiments is e.g., an Extensible Messaging and Presence Protocol (XMPP) capable device. Continuing with the example case where the secondary device 122 is a DVR, the DVR storage information is then used by a network-based recording scheduler/manager which, in response to a user request to record a program, converts the request to a start-time, end-time, and source parameters (e.g., QAM tuning parameters or an URL to pull the content from). If the source parameter is a QAM tuner then the secondary device 122 either uses its own QAM tuner and transcription mechanism if included in the secondary device or the secondary device 122 passes the data through a device that does have the QAM tuner and transcription mechanism capability, e.g., local DLNA QAM device). If the parameter is an IP network URL then the device 122 can simply pull the content from the network and store it to the local disk. The headend scheduling service, e.g., the recording scheduler/manager, takes into account the disk size within the secondary device 122 and other registered devices and subtracts the estimated space required from its stored value. After the recording is complete, the secondary device 122 sends the actual storage space used and remaining space back to the scheduling service. In some embodiments the scheduling service pools the total disk space within the premise and can even spread the content across multiple disk devices. In the example of the device 122 being a recording device the start and stop times are needed for "live" content and are not needed for pulling down static assets.

Figure 3:
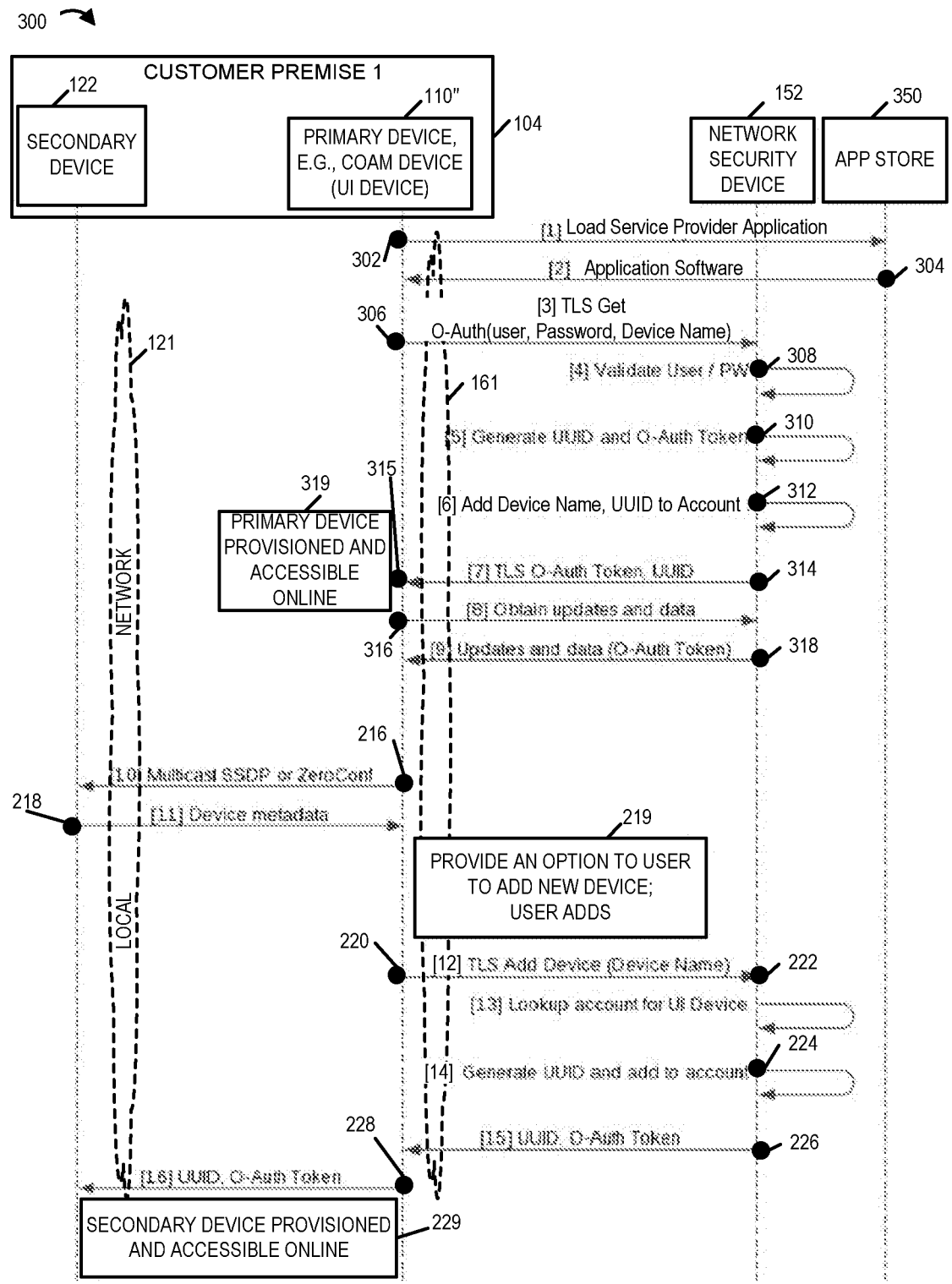
FIG. 3 is a signaling diagram illustrating various signals, e.g., messages, which are communicated between devices of the system of FIG. 1 as part of implementing an exemplary method in accordance with another exemplary embodiment.

FIG. 3 illustrates another exemplary embodiment of a method implemented in accordance with the invention. At the top of FIG. 2, various elements 200 which may participate in the exemplary method of provisioning and authenticating a secondary device, e.g., COAM device, on a local network in a customer premise in accordance with one embodiment of the invention, are shown.

The illustrated elements 300 include a primary customer premise device 110" and the secondary device 122 included in the customer premise 104 and the network security device 152. Also among the elements 300 is an APP STORE 350 (application store) from which customer devices, such as the primary device 110", can download an exemplary service provider application which can be used to connect to the service provider's headend 102 and obtain services. The primary customer premise device 110" is similar to the customer premise device 110 described with regard to FIG. 1. However, in the particular example of FIG. 3, it is a COAM device with a user interface (UI device) which may have been purchased by the customer and which the customer wants to use to access services provided by the service provider. Thus a difference in the embodiments illustrated by FIG. 2 example and FIG. 3 example is that in FIG. 3 example the primary device 110" is a COAM device. As will be discussed now this makes a difference in the manner the primary device 110" is authenticated by the service provider system 100. However as can be seen from the signaling diagram of FIG. 3, the steps associated with authenticating and provisioning the secondary device 122 remains the same with regard to FIG. 2 example. Accordingly, in order to avoid unnecessary repetition and to simplify discussion as well as illustration, the same reference numbers as used in FIG. 2 signaling diagram have been used in the FIG. 3 example for the steps (steps 216, 218, 220, 222, 224, 226 and 228) associated with authenticating and provisioning the secondary device 122. Moreover, the information boxes 219 and 229 have been identified by the same reference numbers as used in FIG. 2 and present the same information.

The aspects of FIG. 3 embodiment which are different than those discussed with regard to FIG. 2 will now be discussed.

The process starts with the primary device 110" being turned on and requesting download of the service provider's application (APP) from the APP store 350 as illustrated by step 302. In step 304 the APP is sent back from the APP store 350 and stored and executed by the primary device 110". In some other embodiments the service provider's application is preloaded in the primary device 110" and not necessarily downloaded.

Once the service provider APP is executed/launched on the primary device 110", in step 306 an authentication token request is sent by the primary device 110" to the network security device 152 as part of signing into the APP using pre-established username and password credentials. In some embodiments as part of the authentication token request the primary device 110" name is also sent.

In step 308 the network security device 152 validates the username and password. In step 310 the network security device 152 in response generates a UUID and authentication token for the primary device 110". In step 312 the network security device 152 adds the primary device 110" name and assigned UUID to a list of devices associated with the customer account.

In step 314 the network security device 152 sends the UUID and authentication token to the primary device 110". The primary device 110" receives the authentication token and UUID in step 315. In some embodiments the authentication token is an O-Auth 1.0 token. From this point forward, the primary device 110" is considered authenticated and can access services, e.g., content and metadata services as indicated by box 319.

In step 316 the primary device 110" requests to obtain updates and data from the service provider headend 102. In step 318 the service provider headend 102 sends the updates and data to the primary device 110".

As discussed above the steps (steps 216, 218, 220, 222, 224, 226 and 228) associated with authenticating and provisioning the secondary device 122 are the same as or similar to those discussed with regard to FIG. 2 example and the discussion will not be repeated.

Figure 4B:
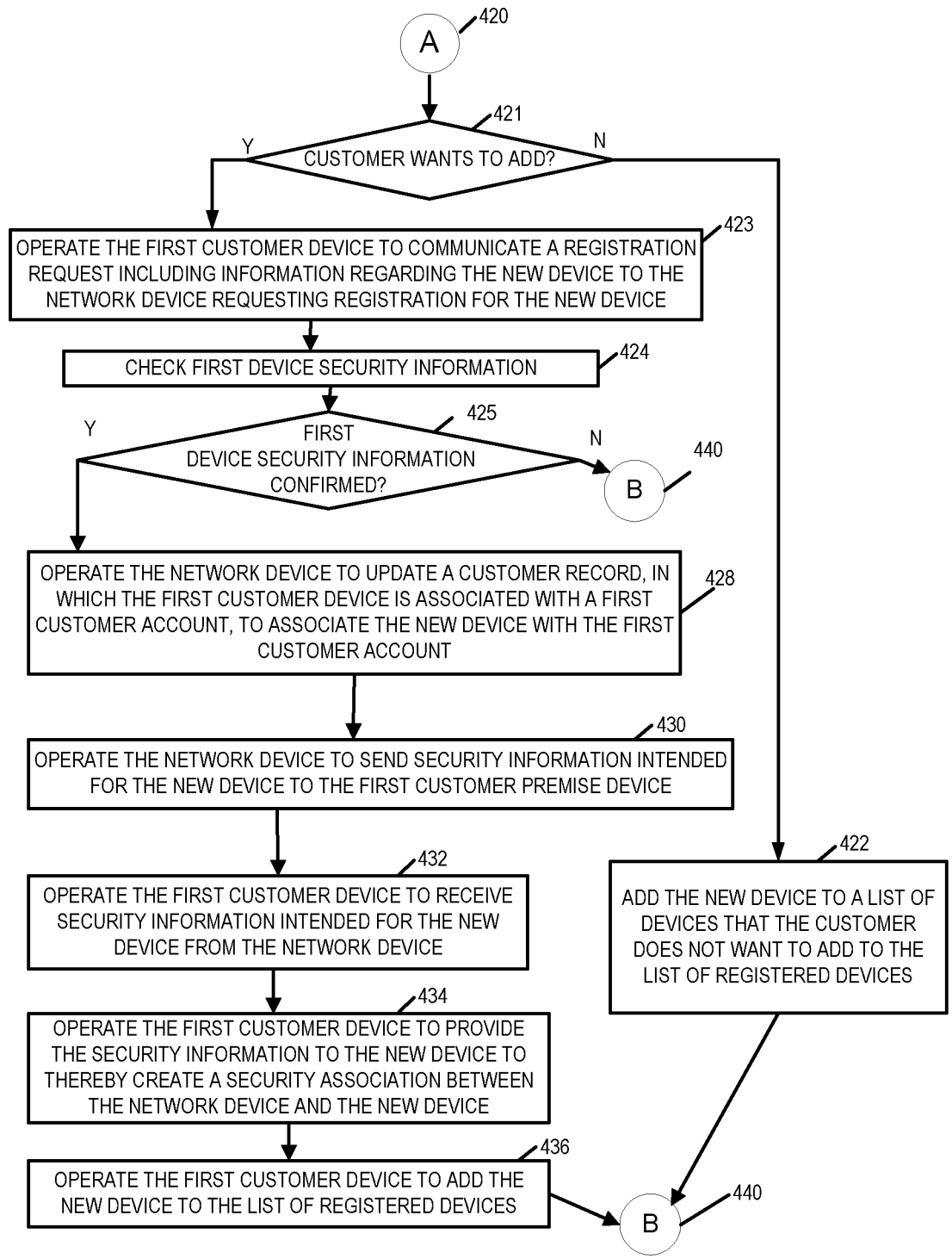
FIG. 4, which comprises the combination of FIGS. 4A and 4B, is a flow chart illustrating the steps performed in accordance with a method of the present invention in an exemplary embodiment.

FIG. 4, which comprises the combination of FIGS. 4A and 4B, illustrates the steps 400 of a method for provisioning and providing services to one or more devices on a local network. The method begins in step 402 with the various devices of the system, e.g., the system 100 shown in FIG. 1, being powered on and beginning operation. For example, in step 402 the authentication and authorization device w 152 which operates as a network security device to authenticate and authorize devices, e.g., located as customer premises, to receive services is powered on and becomes available for authenticating and authorizing devices to receive services. The authentication and authorization operations performed by network security device 152 may be performed as part of provisioning a device, e.g., registering the device for services, associating it with a customer account, and providing it with software and/or parameters needed to receive the service.

Operation proceeds from start step 402 to step 404 in which a first customer premise device, e.g., primary customer premise device 110 establishes security association with a network device, e.g., network security device 152, based on at least one of: i) first device identification information and information indicating that the first customer premise device is authorized to be used with a first customer account corresponding to a first customer premise or ii) based on account identification information and authentication information provided by the first customer premise device to the network device 152. The first approach where a device identifier, e.g., a MAC address of the primary customer device 110 is used is well suited for leased equipment where the first device 110 sends a message to the network security device 152 which includes its MAC address. The message may include a certificate which was assigned to the first customer premise device 110 from a certificate authority prior to the customer premise device contacting the network security device.

The security device 152 then checks account records and determines which customer account the device is already associated with as a result of a device lease agreement and, assuming the MAC address is associated with a customer record authorizes the device to receive one or more service in accordance with the customer agreement and/or customer account with which the device is associated.

The security device 152, e.g., security server, sends as part of the process of establishing a security association with the first device 110, security information to the first device. The security information may and sometimes does include an authorization token. While the term authorization token in used in this context an authorization token may be implemented as a shared secret or include a shared secret. The token and/or shared secret can be used at a later time as a piece of security information by the first device 110 to obtain services and/or prove that it has a security association with the network security device 152. Proving that the first device has a security association may involve an exchange of messages between the first device 110 and the device to which proof of the security association is to be provided. Proving the security may include a challenge send from the security device 152 and response message sent by the first device 110 as part of a message exchange whereby the network security device 152 provides a value as part of the challenge and the first device 110 responds with a value e.g., generated using a hash function and its authentication token or shared secret. The security device 152 can then determine if the returned response value matches the value the challenged device 110 would be expected to produce if it had possession of the authentication token or shared secret supplied to the first device 110. In this way after the security association between the first device 110 and the network security device 152 is established, the first customer device 110 has a security association with the network security device and the first device 110 is authorized to receive services associated with the customer account corresponding to customer premise 1 where the first device 110 is located.

Rather than rely on stored lease information associating a MAC address or other device identifier with a customer account, in step 404, the network security device may rely on device, account and/or security information provided by the first device 110 to establish a security association. For example, if the first device 110 is a customer purchased device, a user may download an application from the Internet or another source, execute the application, have the first device 110 contact the security device 152 via the Internet or another communications network such as cable network 161, and then provide information to the security device 152 identifying the device 110, identifying a customer account with which the device is to be associated and providing authentication and/or other security information such as a user password which may be used as part of an authentication and/or authorization procedure performed when the first device 110 registers with the network security server 152 for purposes of being authorized to receive one or more services. The information identifying the device 110 may be the MAC address of the device or some other identifier. The information identifying a customer account may be an account number, a customer identifier, email address, phone number, and/or some other information which can be used to identify a customer account with which the first device is to be associated. The authentication and/or authorization information may include a password or other security information, which is available to the customer corresponding to the customer account with which the first device 110 is to be associated. Assuming the information from the first device matches expected security information, e.g., a password, corresponding to the customer account identified based on the received information, the security device 152 updates information corresponding to the identified customer account, e.g., the customer account corresponding to the customer to whom customer premise 1 corresponds. The security device included the first device in a list of devices which are registered to receive services corresponding to the customer account and also sends the first customer device an authentication token or shared secret which can be used for authentication purposes when later seeking services or trying to take other actions with respect to the first customer account. The first authentication token or shared secret may have a lifetime associated with it and the first device may be required to register and/or obtain a new or updated security token or shared secret to receive services after the lifetime of the first security information, e.g. first authentication token, expires.

While the phrase "authentication token" is used during the remaining portions of the description, this term is to be interpreted as covering security tokens or shared secrets which can be used for authentication purposes.

In step 406, the first device 110 is operated to receive the authentication token from the network security device 152. The first device can then, and sometimes does use the use the authentication token to receive services, VOD or other services, from a service provider device, e.g., content server 146 of a service provider which is associated with or who owns the network security device 150.

Once the first device 110 receives the authentication token, it has a security association with the network security device 152 and can use the token to secure communications and/or obtain services.

In the FIG. 1 example, the customer device 110 is referred to as the primary customer device, e.g., because it is first device at the customer premise 104 to register with the network security device 152 and/or because is serves as a device through which other devices on the local network 121 can initially interact with the network security device 152 in accordance with various aspects of the invention. In various embodiments, the primary device 110 includes a user interface via which a user may be presented options and can input responses. In some embodiments, the interface includes a display 112 which may be integrated into the customer premise device 110 or external to the customer premise device and an input device for receiving user input. The input device may be a keypad or touch screen or a sensor, e.g., for receiving signals from a remote control on which a user presses buttons to provide input to the customer premise device 110. In addition to the user interface, the customer premise device includes a local network interface which maybe a wired, e.g., Ethernet interface, or wireless interface, e.g., a Wi-Fi® interface.

In step 408, via the local network interface, the primary customer device 110 monitors for one or more new devices on the local customer premise network on which the primary customer premise device 110 is located. Such monitoring may be passive, e.g., with the primary device simply monitoring the local network 121 for signals communicating device identifiers of devices which were not previously on the network 121 or active with the primary customer device 110 broadcasting a signal used to trigger device identification signal announcements on the local network allowing the primary customer device to detect what devices are attached to the local network. In step 410, the primary device at the first customer premise 104 checks to determine if a new device was detected on the local network. Step 410 which involves determining if a new device was detected may, and sometimes does include, check a list of know devices which were previously detected by the first customer premise device to see if a detected device is new, e.g., not included on the list of known previously detected devices.

If a new device was not detected on the local network 121, operation proceeds to monitoring step 408 without the first device taking any action with regard to registering a new device since no new device was detected. If however in step 410 it is determined that a new device was detected by the primary device 110 on the local network 121, e.g., secondary device 122, operation proceeds to step 412.

It should be appreciated the new device that is detected may be a mobile device connecting to the local home network 121 wirelessly. While the new device may be owned and belong to the owner of the customer premise it may also be a device which belongs to a user who is visiting the first customer premise 104 in which case the new device should not be associated with the first customer account corresponding to customer premise 1 104. Thus, the new device may belong to someone not entitled to receive services based on the first customer account and may in fact be registered to receive services corresponding to a different customer account in which case associating it with the first customer account could create accounting and/or service errors.

In step 412 the primary customer device 110 checks with the network security device 152 to determine if the new device that was detected, e.g., secondary device 1 122, is already registered with regard to the first customer account which is the customer account which is the customer account with which the primary customer device 110 is registered in step 404 as part of the step of establishing a security association with the network security device 152. It may do this by sending a registration check request to the network security device 152 with an identifier of the newly detected device, e.g., MAC address or other identifier corresponding to the newly detected device. The security device 152 reports back registration status to the extent that it is known with regard to the newly detected device. For example, the security device may indicate the new device is already registered with the first customer account, registered with another customer account or not registered.

If in step 414 it is determined that the new device is already registered with respect to the first customer account, operation proceeds to step 416 in which the first customer device updates a record of known devices and related information to add the new device to the list of known devices and to indicate that the new device is already registered with respect to the first customer's account and thus should be entitled to receive services authorized by the first customer account. Operation proceeds from step 416 to monitoring step 408 where the first device 110 will proceed to monitor again for new devices on the local network 121 which may need to be registered.

If in step 414 if it is determined that the new device is not already registered with the first customer account, operation proceeds to step 418. In step 418 the first device 110 presents an option to a customer, via a user interface, e.g. on a display 112 and/or audibly via a speaker of the first device 110, to indicate that the user wants to add the new device to the list of registered devices associated with the first customer account. Operation proceeds from step 418 to step 421 via connecting node 420.

In step 421, a determination is made as to whether the customer wants to add the new device to the first customer account, e.g., by registering it with the security device 152 with respect to the first customer account. The determination may be made from input received from a user, e.g., indicating whether or not the device is to be added, or based on the failure to receive an input from the user in a predetermined time indicating that the detected device should be added to the first customer account. The user input may be received via a keypad or touch screen input of the device 110 or via a remote control input which receives signals from a remote control device controlled by a user. In some embodiments failure to detect a user input, e.g., the user does not respond to the prompt in a predetermined amount of time, is interpreted as a negative user response. This approach avoids accidentally registering a device which the customer does not want associated with an account and potentially removing a previous association between the detected device and another customer's account.

If in step 421 it is determined that the customer does not want to add, e.g., register, the newly detected device with respect to the first customer account, e.g., because it is registered for use with another account or does not belong to the first customer, operation proceeds to step 422. In step 422 the newly detected device is added to a list of devices known to the first customer premise device 110 but with information indicating that the user, e.g., first customer, does not want to add the detected device to the account corresponding to the first customer.

Operation proceeds from step 422 back, via connecting node 440, to monitoring step 408 which is performed by the first device 110 on an ongoing basis.

If in step 421 it is determined that the user has affirmatively indicated via user input that the newly detected device is to be added to the first customer account, operation proceeds along a device registration path which begins with step 423. As part of the process of registering the newly detected device, the first device 110 leverages, e.g., uses, its security association with the network security device to communicate registration information on behalf of the newly detected device, e.g., second customer premise device 122 thereby allowing the network security device 152 to reliably determine that the newly detected device is in fact located at the first customer premise 104 and to trust that a user at the customer premise has indicated a desire to associate the newly detected device 122 with the first customer account. In step 423, the primary customer premise device 110 may, and sometimes does, communicate a value generated based on the authorization token it received from the security device 152 along with device identification information, e.g., a MAC address or other identifier corresponding to the detected device 122 to be registered and/or other information such as device type information and/or user information obtained from the detected device 122 via the local area network 121.

In step 424 a security check is made by the security device 152 to make sure that the registration request, corresponding to the detected device 122, was received from the first device 110 with which a security association was previously established. The security check may include checking a value in the received registration message to see if it matches an expected value, e.g., a value generated using the authorization token that was previously supplied to the first device 110.

If in step 110, the security check fails, e.g., the network security device 152 is unable to confirm that the registration request message is from the first device 110, operation proceeds back to the monitoring step via connecting node B 440 with no further action being taken with respect to what is now an untrusted registration request.

If, however, in step 425 the received registration message passes the security check, e.g., security information in the received message is consistent with what should have been received from the first device with which the security association has already been established, operation proceeds to step 428. In step 428, the network security device 152 is operated to update the customer record corresponding to the first customer with which the first device is already registered to include information corresponding to the detected device, e.g., secondary device 122. Thus, as part of registering the second device 122 the customer record corresponding to the first customer is updated to indicate that the second device 122, in addition to the first customer premise device 110, is entitled to receive services corresponding to the first customer account, e.g., in accordance with a contract between the first customer an the service provider. In addition to performing a customer record update, the network security device provides security information, e.g., a security token and/or security certificate, to be used by the second device 122 when obtaining services corresponding to the first customer account. The network security device 152 may also provide an IP address to be used by the second device 122.

The security information intended for the detected device along with the IP address information is communicated, in step 430, from the security device 152 to the first customer premise device 110 for delivery to the second customer premise device.

Operation proceeds from step 430 to step 432 in which the first customer premise device 110 is operated to receive the security and/or address information intended for the detected device, e.g., the second device 122. The first customer premise device 110 then provides, in step 434 the security information and/or address information to the detected device 122, e.g., via a message communicated over the local home network 121. By providing the security information the first device 110 establishes a security association between the second device 122 and the network security device 152 which can be used from that point forward by the second device 122, e.g., to receive services and/or renew the registration without further involvement of the first device 110. In some embodiments the second device 122, after receiving the security information and IP address uses the information and IP address to obtain services, e.g., video services from a service provider device such as the content server 146.

Operation proceeds from step 434 to step 436 in which the first customer premise device 110 adds the detected device 122 to the list of registered devices associated with the first customer's account. Thus, the next time the second device 122 is detected it will not be treated as a new device since it is already know and listed in the set of known devices attached to the local network 121 maintained by the first customer premise device 110.

Operation proceeds from step 436 back to monitoring step 408 via connecting node B 440. Monitoring for new devices attached to the local network 121 and updating the list of known devices may continue on an ongoing basis, e.g., with the primary device 110 periodically requesting devices on the network 121 to announce their presence in some embodiments while in some other embodiments the devices on the local network 121 announce their presence via SSDP headers without any request from the primary device 110.

In some embodiments, in addition to adding devices to the list of devices known to be attached to the local network 121, the first device also removes devices from the list, e.g., when they do not respond to a request, or in some cases multiple requests, to announce their presence on the network. In some embodiments the first device removes devices from the list of device attached to the local network 121 when the first device 110 does not hear a signal form the device being removed in a predetermined amount of time, e.g., an amount of time indicative of the device having been turned off or removed from the network, e.g., due to the device leaving the customer premise 104.

In the above described manner, a first device's established security relationship can be used to provision a second device, on the same local network as the first device, with the second device being provided with the same level of security and access to services as the first device and being associated with the same customer account as the first device. The provisioning of the second device can be implemented with no or little input from a user. After the provisioning, the second device can operate as if it had been provisioned without the assistance of the first device and can renew its security information and IP address as needed whether or not the first device remains present on the local network.

The method shown in FIG. 4 may be performed by a first device for the duration of time it is powered on. As a result it may detect multiple different new devices and may take different actions in response input received from a user in response to a user prompt presented to a user after a device is detected.

For example, consider a case where the first device a new device, e.g., secondary device 1, 122 and presents a user with a prompt seeking user input indicating whether the device should be associated with the first customer's account or not as may occur in step 418. In response to the prompt the user may provide input indicating that the device should be registered and thereby associated with the first customer account. In such a case, in step 421 the first device would decide to follow the processing path, including step 423, which is used to register the newly detected device 122 with the first customer's account. If however the user indicated he did not want to register the newly detected device 122 with the first customer's account, operation would have proceed to step 422 with the device 122 being added to a list of devices which were detected but which are not to be associated with the first customer's account.

Assuming for purposes of this example that the user indicated that the detected device 122 is to be registered the first device 110 will contact the network security device on behalf of the detected device 122 and seek to register the device 122. The network device will, based on the security information included in the registration request corresponding to the first device, trust the request, register the second device 122 with the first customer account and then provide to the first device security information and/or an IP address to be used by the second device 122. The first device will then forward the security information, e.g., an authorization token, and IP address to the second device 122 for use in obtaining services from one or more network devices, e.g., VOD services. The first device 110 will also add the second device to a list of known registered devices which are associated with the first customer's account that is maintained by the first device 110.

Carrying the example on further, the first device may detect an additional new device, e.g., secondary device K 124 on the local network 121. As in the case of detecting the secondary device 122, the first customer premise device 110 will prompt the user to indicate whether the additional new device 124 should be associated with the first customer account, e.g., registered for services provided in accordance with the provisions of the first customer premise account. The action taken by the first customer premise device 110 will depend on the user input received in response to the prompt provided to the user. If the user indicates that the additional new device 124 should be registered with the network security device 152 as corresponding to the first customer premise account steps 423 to 436 will be performed with the secondary device 124 being treated as the new device. However, if the user indicates that additional new device, secondary device 124, is not to be registered operation will proceed from step 421 to step 422 in which the new device is added to a list of detected devices which are not to be added to the list of registered devices corresponding to the first customer account. Both possible user indications are contemplated and may occur at different times with respect to different devices as the user chooses to register some but not necessarily all devices detected by the first customer premise device 110.

While in some embodiments user input is requested before associating a newly detected device with the customer account corresponding to the local network to which the detected device is attached, in other embodiments as long as the newly detected device is not registered for services with an account when it is detected, the newly detected device will automatically be provisioned via the detecting device and associated with the customer's account. This approach is particularly useful when customers are likely to be adding new devices to a local network and still avoids the risk of accidentally and automatically associating a device registered with another customer account, to the account of a network to which the device is temporarily attached, since the network security device 152 will refuse to change the existing registration without affirmative approval of a user to register the already registered device.

Figure 5:
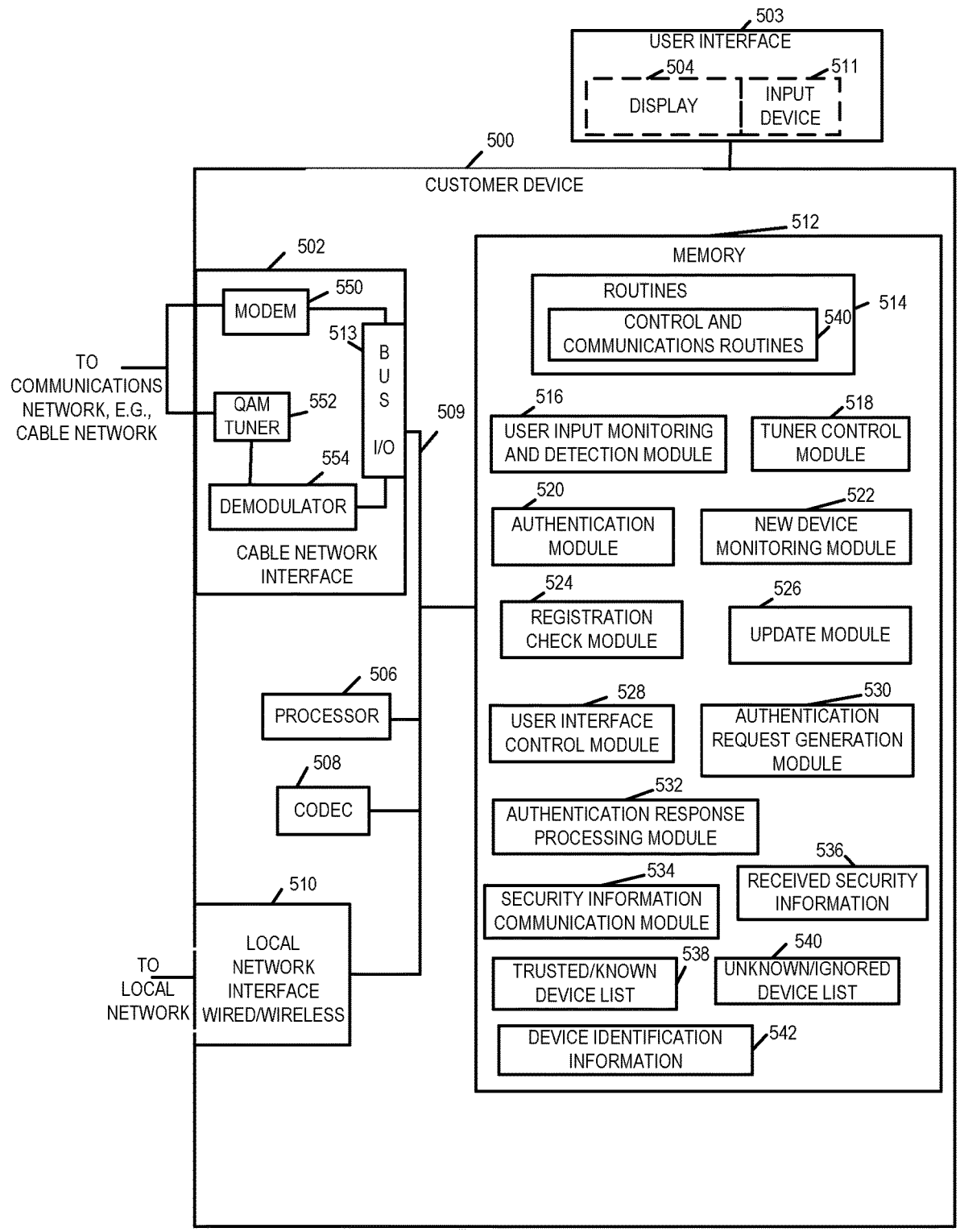
FIG. 5 illustrates an exemplary customer premise device which can be used in the exemplary system shown in FIG. 1.

FIG. 5 illustrates an exemplary customer premise device 500, e.g., a set top box, implemented in accordance with one exemplary embodiment. The customer premise device 500 may be used as any of the primary and/or secondary devices at the customer premises shown in FIG. 1-3. In various embodiments the customer device 500 is configured to implement various steps of the method of flowchart 400, e.g., steps associated with the first device, to control the operation of the device 500 in accordance with the invention.

As shown in FIG. 5, in some embodiment the customer premise device 500 includes and/or is coupled to a user interface 503 which includes a display device 504, e.g. a monitor and/or a Television (TV) and an input device 511. The input device 511 may be a keypad, touch screen sensor, and/or a microphone for receiving and processing customer input commands. The customer premise device 500 further includes a cable network interface 502, a local network interface 510, a processor 506, a codec (Coder/Decoder) 508, and a memory 512 coupled together via a bus 509. The various elements of the content playback device 500 can exchange data and information over the bus 509.

Via the cable network interface 502, the customer premise device 500 can exchange signals and/or information with other devices and/or system elements such as the servers in the network headend 102, via the cable network 161. The cable network interface 502 supports the receipt and/or transmission of content, security data and/or other information from/to different servers, e.g., the content server(s), network security server, etc. The cable network interface 502 in some embodiments also includes, e.g., an infrared (IR) signal receiver to receive signals from a user remote control device. Thus in some embodiments the cable network interface 502 may additionally include an IR or radio interface for receiving signals from a remote control device. The cable network interface 502 includes a modem 550, e.g., cable modem, which supports receiving content, a QAM tuner 552 and a demodulator 554. The QAM tuner 552 receives programming content from a channel to which the content playback device 500 tunes. The demodulator 554 demodulates the received content and/or information. The elements of the interface 502 are coupled via a bus interface 513 to the device bus 509.

The local network interface 510 maybe a wired, e.g., Ethernet interface, or wireless interface such as, e.g., a Wi-Fi® interface, Bluetooth® interface, etc. Via the local network interface 510 the customer device 500 can exchange signals and/or information with other various customer premise equipments such as one or more secondary devices. The local network interface 510 supports the receipt and/or transmission of content, device discovery announcements, and/or other information over the local network 121 from other customer devices. For example in various embodiments the customer device 500 receives, via the local network interface 510, announcements from one or more other customer devices connected to the local network 121 thereby enabling the customer device 500 to detect presence of other devices on the local network 121. Furthermore, via the local network interface 510 the customer device 500 communicates security information corresponding to a new detected device, e.g., a secondary device, seeking authentication to the new device over the local network 121 in accordance with one feature of some embodiments of the invention.

The processor 506, e.g., a CPU, executes routines 514 and one or more modules and controls the customer device 500 to operate in accordance with the invention. The processor 506 is responsible for controlling the operation of the customer device 500 including, e.g., presentation of information and/or programs via the user interface. To control the customer device 500, the processor 506 uses information, various modules and/or routines including instructions stored in memory 512. In one embodiment the processor 506 is configured to perform functions corresponding to various steps, e.g., steps associated with the first customer premise device, of the method of flowchart 400. In some embodiments the processor 506 is configured to implement each of the modules shown included in the memory 512. The Codec 508 is capable of performing encoding and/or decoding operations on a digital data stream or signal.

In addition to the routines 514, the memory 512 includes a user input detection module 516, a tuner control module 518, an authentication module 520, a device monitoring module 522, a registration check module 524, an update module 526, a user interface control module 528, a registration request generation module 530, a registration/authentication response processing module 532, a security information communication module 534, received security information 536, trusted/known device list 538, ignored/unwanted device list 540 and device identification information 542.

Routines 514 include communications routines and/or device control routines 540. User input detection module 516 detects a user input, e.g., input from a user received by the device 500. The user input may be sent by a control device such as a remote control, or by other means, e.g., selecting an option by pressing a button on the device or icon on a touch screen etc. User input signals from a remote control may be received via the interface 502. The user input detection module 516 determines, on receipt of an input, e.g., a control signal providing user input, what type of selection has been made by the user, e.g., a selection instructing to tune to a specific channel, a program guide selection, or input indicating selection of a device to be added as a trusted device to receive services, etc. In various embodiments the user input detection module 516 determines, from user input received via user interface 503, that the customer wants to register an additional new device with the customer's account.

The tuner control module 518 is configured to control the tuner 552 to tune to a frequency corresponding to a program channel to be viewed. This may be a user selected channel or, a channel to be tuned to when instructed by a server in the headend 102. The authentication module 520 is configured to interact with the network security device 152 to establish security association between the customer premise device 500 and the network security device 152 based on at least one of: i) customer device identification information and information indicating that the customer premise device is authorized to be used with a customer account corresponding to a customer premise (e.g. as in the case where a particular device is leased or provided by the service provider who also operates the network security device 152) or ii) based on account identification information and authentication information provided by the customer premise device 500 to the network device 152. Thus the authentication module 520 communicates and performs security negotiations with the network security device 152 in order to receive authentication for the customer device 500 to receive services from the service provider. In various embodiments the authentication module 520 is further configured to facilitate authentication and registration of one or more added devices, e.g., secondary devices added after the customer device 500 has established security association with the network security device 152, in accordance with the features of the invention. Thus it should be appreciated that the authentication module 520 performs and/or controls signaling associated with various authentication/device registration steps shown in FIGS. 2-3.

The new device monitoring module 522 is configured to monitor for signals, e.g., announcements, from one or more devices on the local network 121 at the customer premise where customer device 500 is located. The registration check module 524 is configured to perform one or more checks/verifications to determine whether a newly detected device on the local network is registered with the same customer account associated with the customer device 500. In doing so the registration check module 524 is configured to communicate with the service provider network security device 152 to perform the checks/verifications.

The update module 526 is configured to update a list of known or trusted/registered device 538 to include a newly detected device on the local network when it has been confirmed that the detected device is registered with the same customer account associated with the customer device 500. The update module 526 is further configured to update the list 538 to add one or more new devices added to the local network 121 after the one or more new devices have been registered/authenticated by the network security device, e.g., via assistance from the customer device 500.

The user interface control module 528 is configured to control the user interface 503 elements in accordance with the features of the invention. The user interface control module 528 controls presentation of prompts/dialog boxes to the user, e.g., on the display 504, to notify customer regarding the detection of one or more new devices on the local network 121. For example the user interface control module 528 controls presentation of a dialog box to the user via display 504 such as "DO YOU WANT TO REGISTER DEVICE "MY_iPAD_049XX WITH YOUR CUSTOMER ACCOUNT? or "DO YOU WANT TO ALLOW DEVICE "MY_iPAD_049XX TO ACCESS SUBSCRIBED SERVICES?". The customer can then respond by providing an input via the input device 511, e.g., by pressing a key, selecting an icon on a touch screen by voice command and/or another method. The user interface control module 528 is further configured to control process the customer's response and take further action accordingly, e.g., by providing a signal indicating customer's response to one or more modules or to the processor 506.

The authentication request generation module 530 is configured to generate a registration/authentication request for the customer device 500 which is sent to the network security device 152 for seeking authentication. In various embodiments the authentication request generation module 530 is further configured to generate registration/authentication requests for one or more new additional devices detected on the local network that the customer wishes to add. In some such embodiments a registration request for a new additional device includes information corresponding to the additional new device.

Authentication response processing module 532 is configured to process the response to a registration/authentication request received from the network security device 152. In some embodiments the response processing module 532 processes a received registration/authentication response to recover security information, e.g., authentication tokens, and identification/address information of one or more headend 102 servers and/or other information to allow the customer device 500 to access available services from the headend 102.

Security information communication module 534 is configured to securely communicate security information, e.g., authentication tokens and/or other information, corresponding to newly detected devices detected on the local network, to these detected devices. The security information corresponding to these devices is obtained from the network security device 152 as discussed in detail earlier. Thus the security information communication module 534 provides security information to one or more secondary/new devices to thereby create a security association between them and the network security device.

The received security information 536 includes authentication tokens, security certificates etc., corresponding to the customer device 500 and one or more other devices detected on the local network 121. The received security information 536 may, and in some embodiments is, received in a registration/authentication response from the network security device 152. The trusted/known device list 538 includes information, e.g., identification, name, capability/function information, corresponding to known registered devices which are known to be authenticated/registered. The unknown/ignored device list 540 includes information corresponding to unknown devices and/or devices which may have been detected earlier but have been ignored/denied association with the customer's account, e.g., by the customer in response to a query by the customer device 500. The device identification information 542 may include, e.g., Media Access Control (MAC) address of the customer device 500 or some other identifier identifying the device 500. In various embodiments the network security device 152 is either already aware of the customer device identification information 542 (e.g., when customer device is a leased device) or is provided with the device identification information 542 by the customer device 500 e.g., during configuration or registration. In various embodiments the customer premise device 500 is associated in a customer record with a customer account, the customer account corresponding to the customer premise where the customer premise device 500 and the local network are located.

In some embodiments, one or more of the various modules discussed above work in coordination, e.g., with operations being merged to perform a function, to produce a desired output in accordance with the exemplary methods of the invention.

Figure 6:
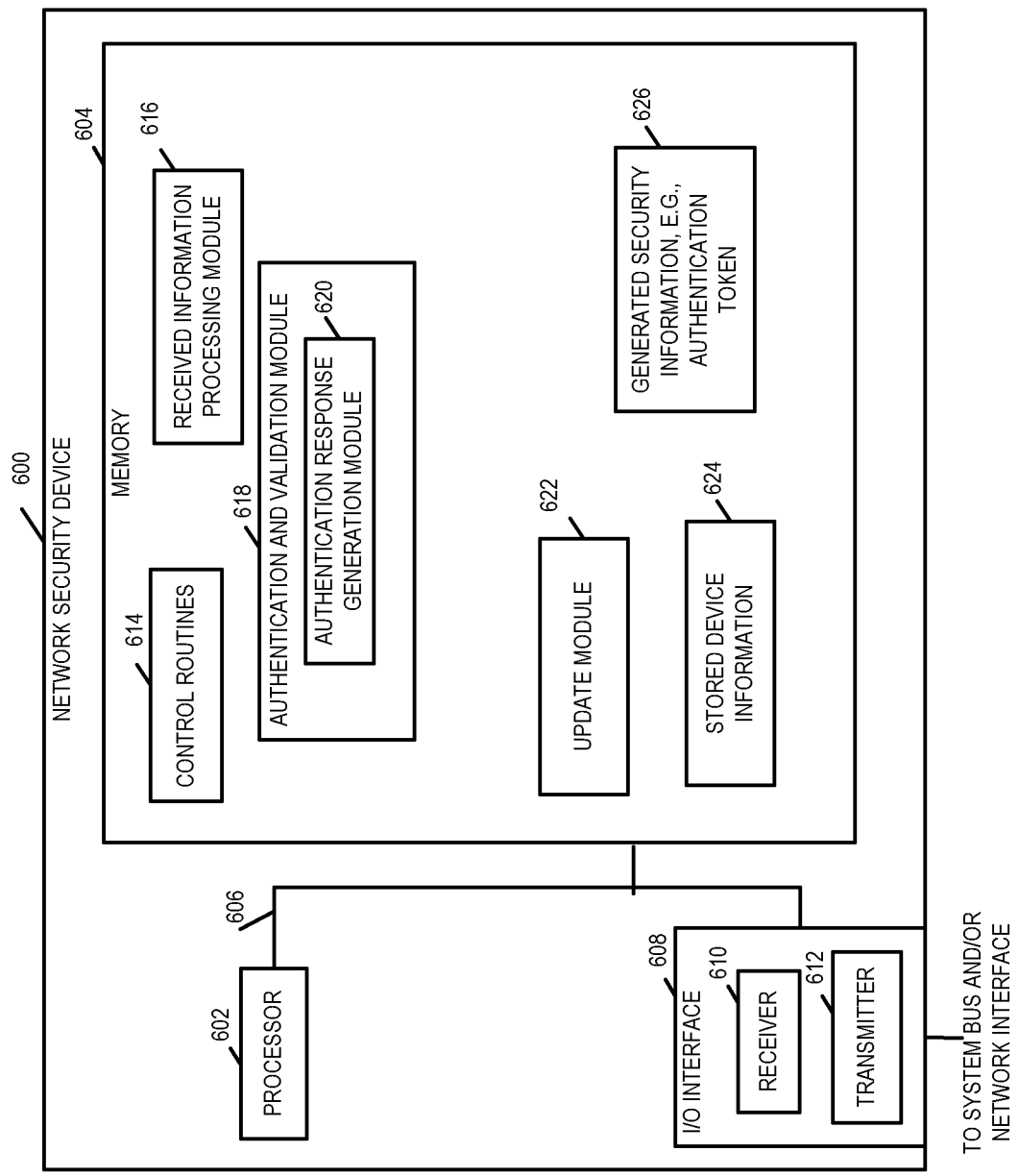
FIG. 6 illustrates an exemplary network security device which can be used in the exemplary system shown in FIG. 1.

FIG. 6 illustrates an exemplary network security device 600 which may be used as the network security device 152 of FIGS. 1, in accordance with an exemplary embodiment of the invention.

As illustrated, the network security device 600 includes a processor 602, an I/O interface 608, and a memory 604 coupled together by a bus 606. The I/O interface 608 includes a receiver 610 and a transmitter 612. The receiver 610 is responsible for receiving and processing messages, control signals, and/or other information. The transmitter 612 is configured to generate and transmit messages, signals, responses and/or other information. In some embodiments, both the receiver 610 and transmitter 612 work under direction of the processor 602 which executes one or more of the routines and/or modules included in memory 604 to control the operation of one or more elements in the security device 600 in accordance with the invention. Thus via the I/O interface 608, the network security device 600 can receive and/or transmit signals, e.g., including security information, configuration information and/or other information from/to one or more other devices. The network security device 600 receives and sends signals to customer devices such as customer device 500 over the communications network 161.

In various embodiments the network security device 600 is configured to implement various steps of the method of flowchart 500 to control the operation of the security device 600 in accordance with the invention. In one embodiment the processor 602 is configured to perform functions corresponding to one or more steps of the method of flowchart 400 discussed earlier.

The memory 604 includes control routines 614 which control overall security device 600 operation in accordance with the invention. Control routines 614 may operate in conjunction with various modules which are used to perform various functions. Modules included in the memory 604 include an information processing module 616, an authentication and validation module 618, a authentication response generation module 620, an update module 622, stored device information 624 and generated security information 626

The information processing module 616 is configured to process signals, e.g., received via the interface 608, to recover information and provide the recovered information to one or more other modules. The authentication and validation module 618 is configured to perform security authentication and registration operation in accordance with the features of the invention. In response to an initial registration request from a customer device seeking to register itself, the authentication and validation module 618 validates security information, e.g., security certificate(s), included in the request and registers the requesting device upon successful validation. In this manner the authentication and validation module 618 facilitates establishing security association with the customer device by registering the requesting customer device with a corresponding customer's account. This is discussed in detail earlier, for example with regard to steps 204, 206, 208 and 210 of FIG. 2. The authentication response generation module 620 is configured to generate a registration response including security token, e.g., authentication token, for the requesting device, which is communicated to the requesting customer device.

In various embodiments in response to a request from a primary customer device to check whether a secondary device is registered with the regard to the customer's account, the authentication and validation module 618 checks whether the secondary device is registered or has an established association with the corresponding customer's account, e.g., by checking the customer database 154 and/or by consulting the BM server 156. The result of such a check, e.g., whether the secondary device is registered or not, is communicated to the primary device.

In various embodiments the authentication and validation module 618 is further configured to perform registration/authentication for one or more secondary devices when a registration for the secondary devices is requested (by sending a registration request for the secondary devices) by registered customer devices, e.g., such as primary device 110. In various embodiments in response to such registration requests the authentication and validation module 618 generates security tokens (e.g., O-Auth) identification information (e.g., UUID) and other information for the secondary devices communicates this information in a registration response to the primary customer device. This processing is discussed in detail earlier, for example with regard to steps 222, 224 and 226 of FIG. 2. The security and/or other information intended for the secondary devices is then communicated by the primary device to the secondary device.

The update module 622 is configured to update a customer's record to update list of devices associated with the customer's account when a new device is registered and/or a previously registered device is removed for some reason, e.g., expiration of security tokens or when a customer requests remove/disassociation of a device with the customer's account.

Stored device information 624 includes device identification, device name and/or address information received from one or more customer devices, e.g., in registration requests and/or other messages. The generated security information 626 includes security information, e.g., certificates and/or authentication tokens generated by the authentication and validation module 618 for customer devices along with their validity duration and/or expiration times.

In some embodiments, one or more of the various modules discussed above work in coordination, e.g., with operations being merged to perform a function, to produce a desired output in accordance with the exemplary methods of the invention.

An exemplary communications method in accordance with an embodiment of the invention comprises: operating a first customer premise device, having a security association with a network device, to detect a second device on a local customer premise network on which said first customer premise device is located, said second device not having a security association with the network device; operating the first customer premise device to communicate information regarding said second device to said network device; operating the first customer premise device to receive security information intended for said second device from said network device; and operating the first customer premise device to provide said security information to said second device to thereby create a security association between said network device and said second device.

An exemplary communications system includes a first customer premise device, having a security association with a network device. In various embodiments the first customer premise device, e.g., device 500, includes a processor, e.g., processor 506, configured to: detect a second device on a local customer premise network on which said first customer premise device is located, said second device not having a security association with the network device; communicate information regarding said second device to said network device; receive security information intended for said second device from said network device; and provide said security information to said second device to thereby create a security association between said network device and said second device.

In some embodiments the security information intended for said second device is an authorization token to be used by said second network device to receive services. In some embodiments the first customer premise device is associated in a first customer record with a first customer account, said first customer account corresponding to a first customer premise where said first customer premise device and said local customer premise network are located.

In some embodiments the processor 506 is configured to create said security association between said first customer premise device and said network device based on at least one of: i) first device identification information and information indicating that the first customer premise device is authorized to be used with the first customer account corresponding to the first customer premise or ii) based on account identification information and authentication information provided by said first customer premise device to the network device. In some embodiments the processor 506 is further configured to add the second device to a list of registered devices which the first customer premise device knows are attached to the local customer premise network.

In some embodiments the processor 506 is further configured to: detect an additional new device on the local customer premise network; prompt a user to indicate that the additional new device should be registered as corresponding to the first customer account; and take an action based on user input received in response to said prompt.

In some embodiments the processor 506 is further configured to: determine from user input received in response to said prompt if the user wants the additional new device to be registered as corresponding to the first customer account or does not want the additional new device to be registered as corresponding to the first customer account.

In some embodiments the processor 506 is further configured to: add the additional new device to a list of detected devices which are not to be registered as corresponding to the first customer account in response to determining that the user does not want the additional new device to be registered as corresponding to the first customer account. In some embodiments the processor 506 is further configured to communicate a registration request including information corresponding to the additional new device to the network device requesting registration for the additional new device in response to determining that the user wants the additional new device to be registered as corresponding to the first customer account. In some embodiments the processor 506 is further configured to: receive from the network device security information and an IP address to be used by said new additional device; and forward the received security information and IP address to the new additional device.

In some embodiments the network device includes a processor, e.g., processor 602, configured to update the first customer record to associate said second device with said first customer account.

Numerous variations on the above described embodiments are possible.

While a logical sequencing of the processing steps of the exemplary embodiments of the methods, routines and sub-routines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A communications method, the method comprising:
operating a first customer premises device, having a security association with a network device, to monitor to detect one or more new devices on a local customer premises network, said first customer premises device being located on said local customer premises network;
checking, at the first customer premises device, to determine whether a new device was detected on the local customer premises network;
in response to said checking determining that a new device was detected on the local customer premises network, operating the first customer premises device to check with the network device whether the new device is already registered, said new device being a second device that does not have a security association with the network device;
operating the first customer premises device to receive security information intended for said second device from said network device;
operating the network device to update a first customer record, in which the first customer premises device is associated with a first customer account, to associate said second device with the first customer account; and
operating the first customer premises device to provide said security information to said second device to thereby create a security association between said network device and said second device.

2. The method of claim 1,
wherein operating the first customer premises device to monitor to detect one or more new devices on the local customer premises network includes operating the first customer premises device to monitor the local customer premises network for a signal communicating a device identifier of a device which was not previously on the local customer premises network;
wherein said local customer premises network is located at a first customer premises; and
wherein said network device is located outside said first customer premises.

3. The method of claim 1, wherein said first customer account corresponds to a first customer premises where said first customer premises device and said local customer premises network are located; and
wherein operating the network device to update a first customer record, in which the first customer premises device is associated with a first customer account, to associate said second device with the first customer account includes indicating in the first customer record that the second device, in addition to the first customer premises device, is entitled to receive services corresponding to the first customer account in accordance with a contract between a first customer and a service provider.

4. The method of claim 3, further comprising:
operating the first customer premises device to add the second device to a list of registered devices which the first customer premises device knows are attached to the local customer premises network.

5. The method of claim 4, further comprising:
operating the first customer premises device to detect an additional new device on the local customer premises network;
operating the first customer premises device to prompt a user to indicate whether the additional new device should be registered as corresponding to the first customer account; and
operating the first customer premises device to take action based on user input received in response to said prompt.

6. The method of claim 5, wherein taking action based on user input received in response to said prompt includes:
determining from user input that the customer does not want to register the additional new device with the first customer account; and
adding the additional new device to a list of detected devices that the customer does not want to add to a list of registered devices corresponding to the first customer account.

7. The method of claim 5, wherein taking action based on user input received in response to said prompt includes:
determining from user input that the customer wants to register the additional new device with the first customer account; and operating the first customer premises device to communicate a registration request including information corresponding to the additional new device to the network device requesting registration for the additional new device.

8. The method of claim 7, wherein taking action based on user input received in response to said prompt further includes:
   operating the first customer premises device to receive security information intended for said additional new device from said network device; and
   operating the first customer premises device to provide said security information intended for said additional new device to said additional new device to thereby create a security association between said network device and said new additional device.

9. The method of claim 1, further comprising:
   prior to the first customer premises device detecting said second device, creating, at the first customer premises device, said security association between said first customer premises device and said network device based on at least one of: i) first device identification information and information indicating that the first customer premises device is authorized to be used with the first customer account corresponding to the first customer premises or ii) account identification information and authentication information provided by said first customer premises device to the network device.

10. The method of claim 1, wherein checking to determine whether a new device was detected on the local customer premises network includes:
    checking, at the first customer premises device, a list of known previously detected devices to determine if a detected device is new, a new device being a detected device which is not included on the list of known previously detected devices.

11. The method of claim 1, wherein the first customer premises device is a device that was configured for service based on a MAC address without requiring user input for authentication or account identification purposes.

12. The method of claim 11, wherein the first customer premises device is a set top box.

13. The method of claim 1, wherein the first customer premises device is a device which is registered and associated with the first customer account based on information supplied by a user of the first customer premises device and security information in the form of a password supplied by a user of the first customer premises device.

14. A communications system, comprising:
    a first customer premises device, having a security association with a network device, said first customer premises device including a first processor configured to control the first customer premises device to:
       monitor to detect one or more new devices on a local customer premises network, said first customer premises device being located on said local customer premises network;
       check, at the first customer premises device, to determine whether a new device was detected on the local customer premises network;
       in response to said checking determining that a new device was detected on the local customer premises network, check with the network device whether the new device is already registered, said new device being a second device that does not have a security association with the network device;
       receive security information intended for said second device from said network device; and
       provide said security information to said second device to thereby create a security association between said network device and said second device; and
    said network device, said network device including a second processor configured to control the network device to:
       update a first customer record, in which the first customer premises device is associated with a first customer account, to associate said second device with the first customer account.

15. The system of claim 14,
    wherein the first processor is configured, as part of being configured to control the first customer premises device to monitor to detect one or more new devices on a local customer premises network, to monitor the local customer premises network for a signal communicating a device identifier of a device which was not previously on the local customer premises network;
    wherein said local customer premises network is located at the first customer premises; and
    wherein said network device is located outside said first customer premises.

16. The system of claim 14, wherein said first customer premises device is associated in a first customer record with a first customer account, said first customer account corresponding to a first customer premises where said first customer premises device and said local customer premises network are located.

17. The system of claim 16, wherein said first processor of the first customer premises device is further configured to control the first customer premises device to create said security association between said first customer premises device and said network device based on at least one of: i) first device identification information and information indicating that the first customer premises device is authorized to be used with the first customer account corresponding to the first customer premises or ii) account identification information and authentication information provided by said first customer premises device to the network device.

18. The system of claim 16, wherein the first processor of the first customer premises device is further configured to control the first customer premises device to add the second device to a list of registered devices which the first customer premises device knows are attached to the local customer premises network.

19. The system of claim 18, wherein the first processor of the first customer premises device is further configured to control the first customer premises device to:
    detect an additional new device on the local customer premises network;
    prompt a user to indicate whether the additional new device should be registered as corresponding to the first customer account; and
    take an action based on user input received in response to said prompt.

20. The system of claim 19, wherein the first processor of the first customer premises device is further configured to control the first customer premises device to:
    determine from user input received in response to said prompt if the user wants the additional new device to be registered as corresponding to the first customer account or does not want the additional new device to be registered as corresponding to the first customer account.

21. The system of claim 19, wherein the first processor of the first customer premises device is further configured to control the first customer premises device to:
add the additional new device to a list of detected devices which are not to be registered as corresponding to the first customer account in response to determining that the user does not want the additional new device to be registered as corresponding to the first customer account.

22. The system of claim 19, wherein the first processor of the first customer premises device is further configured to control the first customer premises device to:
communicate a registration request including information corresponding to the additional new device to the network device requesting registration for the additional new device in response to determining that the user wants the additional new device to be registered as corresponding to the first customer account.

23. The system of claim 22, wherein the first processor of the first customer premises device is further configured to control the first customer premises device to:
receive from the network device security information and an IP address to be used by said new additional device; and
forward the received security information and IP address to the new additional device.

24. The communications system of claim 14, wherein the first processor is configured to control the first customer premises device, as part of checking to determine whether a new device was detected on the local customer premises network, to check a list of known previously detected devices to determine if a detected device is new, a new device being a detected device which is not included on the list of known previously detected devices.

25. The communications system of claim 14, wherein the first customer premises device is a device that was configured for service based on a MAC address without requiring user input for authentication or account identification purposes.

26. The communications system of claim 14, wherein the first customer premises device is a device which is registered and associated with the first customer account based on information supplied by a user of the first customer premises device and security information in the form of a password supplied by a user of the first customer premises device.

27. A non-transitory computer readable medium including machine executable instructions which when executed by a processor of a first customer premises device, which has a security association with a network device, causes the processor to control the first customer premises device to:
monitor to detect one or more new devices on a local customer premises network, said first customer premises device being located on said local customer premises network;
check, at the first customer premises device, to determine whether a new device was detected on the local customer premises network;
in response to said checking determining that a new device was detected on the local customer premises network, check with the network device whether the new device is already registered, said new device being a second device that does not have a security association with the network device;
receive security information intended for said second device from said network device; and
provide said security information to said second device to thereby create a security association between said network device and said second device.

* * * * *